June 8, 1926.	1,587,952
C. W. HARTMAN
LICENSE PLATE HOLDER AND PROTECTOR
Filed Jan. 28, 1925
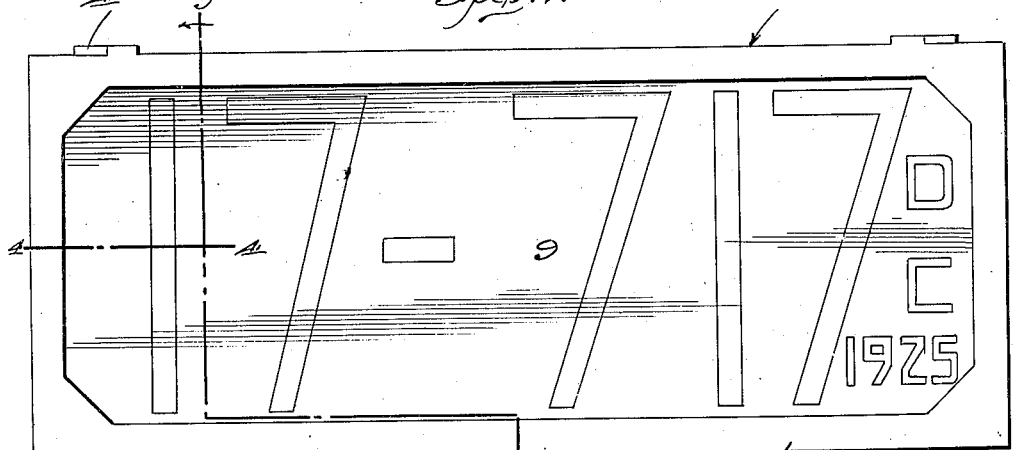
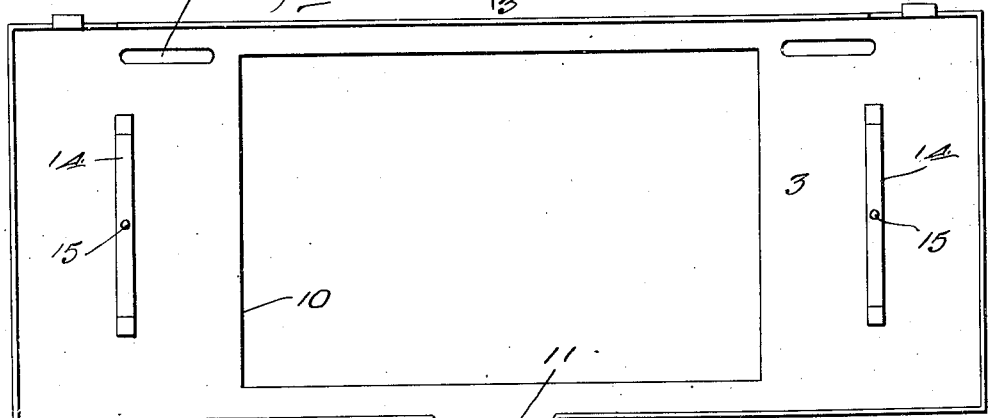
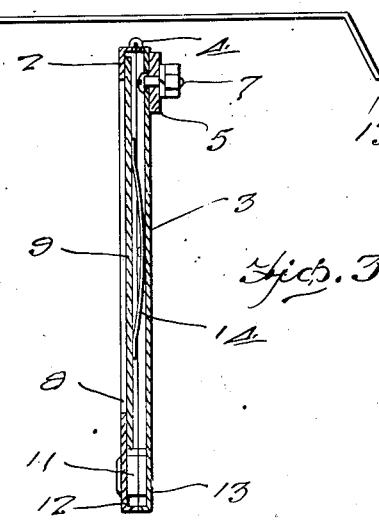
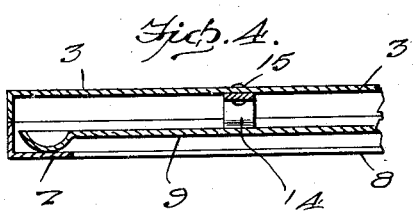
Inventor
C. W. Hartman Patented June 8, 1926.

1,587,952

UNITED STATES PATENT OFFICE.

CHRISTIAN W. HARTMAN, OF SOUTH RIVER, NEW JERSEY.

LICENSE-PLATE HOLDER AND PROTECTOR.

Application filed January 28, 1925. Serial No. 5,276.

This invention relates to improvements in license plate holders and has for its principal object to provide a simple and efficient device, for supporting the license plate on an automobile, in such a manner as to prevent the unauthorized removal of the same after having been once attached.

One of the important objects of the present invention is to provide a license plate holder of the above mentioned character, which is of such construction, as to enable a license plate to be readily and easily inserted in the holder, the latter including a pair of complementary front and rear sections which cooperate to provide a casing for receiving and holding the license plate, the front section being cut out so that the indicia on the license plate is readily visible.

A further object is to provide a license plate holder of the above mentioned character, wherein a key control lock is associated with the complementary sections of the casing, for preventing any unauthorized persons from tampering with and attempting to remove the license plate from its holder.

A still further object is to provide a license plate holder of the above mentioned character, which is simple in construction, strong and durable, inexpensive, and further well adapted for the purpose for which it is designated.

Other objects and advantages of the invention will become apparent during the course of the following detailed description.

In the accompanying drawing, forming a part of this specification, and in which like reference characters designate like parts throughout the several views:

Figure 1 is a front elevation of the device, embodying my invention, showing a license plate supported in the holder.

Figure 2 is a front elevation of the rear section.

Figure 3 is a sectional view, taken approximately on the line 3—3 of Figure 1, and Figure 4 is a sectional view, taken approximately on the line 4—4 of Figure 1.

In the drawing, wherein for the purpose of illustration is shown the preferred embodiment of my invention, the numeral 1 designates generally my improved license plate holder, the same comprising the complementary front and rear sections 2 and 3, which cooperate to provide a substantially rectangular casing. The complementary sections are hingedly secured together, at their upper edges, as clearly illustrated at 4. The rear section 3 is adapted to be secured on any suitable supporting bracket 5, which is secured on a suitable part of a motor vehicle. The upper portion of the rear face of the rear section 3 is provided with the slots 6 for receiving the fastening bolts 7, whereby the license plate holder may be attached to the bracket. The front face of the front section 2 is cut out as illustrated at 2, so that the indicia on the license plate 9, will not be covered by any part of the holder and enabling the indicia to be at all times visible. The rear face of the rear section 3 is also cut out, as illustrated at 10, for lessening the weight of the license plate holder.

The complementary sections of the casing are adapted to be locked together by any well-known type of key controlled lock, such as is shown at 11, the same being associated with the depending portions 12 and 13 formed on the bottom edges of the complementary sections at the intermediate portion thereof. This will prevent any unauthorized person from tampering with and attempting to remove the license plate 9 from the holder 1.

For the purpose of preventing the license plate from rattling and moving around, within the holder, there is provided a pair of flat springs 14, the same being arranged adjacent the respective ends of the holder, the spring being secured intermediate its ends on the rear face of the rear section 3, as illustrated at 17. The free ends of the springs engage the rear face of the license plate 9 and normally hold the license plate in engagement with the front face of the section 2, as illustrated clearly in Figure 3.

The simplicity with which my improved license plate holder is constructed, enables the several parts to be readily opened for removing or placing a license plate in the holder, and after the license plate has once been placed within the holder and the lock mechanism locked, the license plate will be securely held in the holder against accidental displacement therefrom. and further against unauthorized removal.

While I have shown the preferred embodiment of my invention, it is to be understood that various changes in the size, shape, and arrangement of parts may be resorted to, without departing from the spirit of the invention and the scope of the appended claim.

Having thus described my invention, what I claim as new is:

A license plate holder comprising a casing including complementary front and rear sections, each section provided with an extension at its lower edge intermediately disposed thereof, said sections and extensions provided with continuous marginal flanges, means for hinging together the upper portions of the flanges, said front section having an opening to display the indicia on a license plate housed in the casing, spring elements in the casing to prevent rattling of the license plate therein, and locking means associated with the extensions and adapted to be housed thereby so that the sections may be locked together in a close position to prevent unauthorized removal of the license plate.

In testimony whereof I affix my signature.

CHRISTIAN W. HARTMAN.